US007826381B1

(12) United States Patent
Kastuar et al.

(10) Patent No.: US 7,826,381 B1
(45) Date of Patent: Nov. 2, 2010

(54) METHOD AND DEVICE TEST DATA STREAMS BOUND TO EMULATED DEVICES

(75) Inventors: Abhitesh Kastuar, Calabasas, CA (US); Jan-Michael Kho, Calabasas, CA (US); KaChon Lei, Calabasas, CA (US)

(73) Assignee: Spirent Communications, Inc., Sunnyvale, CA (US)

( * ) Notice: Subject to any disclaimer, the term of this patent is extended or adjusted under 35 U.S.C. 154(b) by 197 days.

(21) Appl. No.: 12/130,944

(22) Filed: May 30, 2008

(51) Int. Cl.
G01R 31/08 (2006.01)

(52) U.S. Cl. ........................ 370/242; 370/244; 370/250; 370/252

(58) Field of Classification Search ........................ None
See application file for complete search history.

(56) References Cited

U.S. PATENT DOCUMENTS

| 6,252,891 | B1 | 6/2001 | Perches |
| 6,654,701 | B2 | 11/2003 | Hatley |
| 6,728,929 | B1 | 4/2004 | Luong |
| 7,016,340 | B1 | 3/2006 | McKinion |
| 7,158,907 | B1 * | 1/2007 | Soldo ........................ 702/108 |
| 7,162,377 | B2 | 1/2007 | Amrod et al. |
| 7,181,360 | B1 * | 2/2007 | Nikolac et al. .............. 702/119 |
| 7,272,114 | B1 | 9/2007 | Barkan |
| 2004/0190519 | A1 | 9/2004 | Dugatkin |
| 2004/0240440 | A1 | 12/2004 | Wild et al. |
| 2006/0045021 | A1 * | 3/2006 | Deragon et al. ............. 370/249 |
| 2008/0031151 | A1 | 2/2008 | Williams |
| 2008/0198742 | A1 * | 8/2008 | Kaempfer .................... 370/230 |

OTHER PUBLICATIONS

Spirent Communications: Inspired Innovation, Reference Manual: Spirent TestCenter System, Aug. 2006, pp. 1-133.

* cited by examiner

*Primary Examiner*—Chi H Pham
*Assistant Examiner*—Kouroush Mohebbi
(74) *Attorney, Agent, or Firm*—Ernest J. Beffel, Jr.; Haynes Beffel & Wolfeld LLP

(57) ABSTRACT

The technology disclosed includes a software architecture for methods and devices used to test routers, switches and the like, particularly high volume infrastructure devices. In particular, this architecture associates test data stream definitions with emulated devices that send test frames or packets to and receives them from a system or device under test ("DUT"). By relating the test data stream definitions to definitions of the emulated devices that are coupled to the DUT, automation of test frame and/or test packet design improves, especially where some of the information needed to generate test frames and/or packets is dynamically generated during a test.

15 Claims, 13 Drawing Sheets

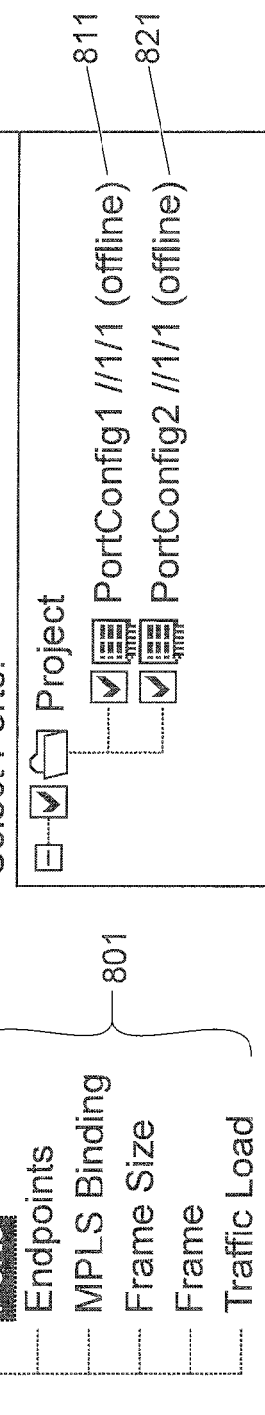

FIG. 10

| 1 path | Find... | Goto... | Auto Select Tunnel | | | |
|---|---|---|---|---|---|---|
| No. | Source | Destination | Bottom label | Next label | Top label | |
| 0 | Router 14 (192.85.1.3/24) | Router 15 (193.85.1.3... | | | | |

| 1 path | Find... | Goto... | Auto Select Tunnel | | | |
|---|---|---|---|---|---|---|
| No. | Source | Destination | Bottom label | Next label | | |
| 0 | Router 14 (192.85.1.3/24) | Router 15 (193.85.1.3... | Router 14 (LDP Router 192.0.1) | | | |

Host Interface | DHCP | DHCP Server | VPN

| Port Name | Host Name | Host Count | Encapsulation | Source MAC Address | Source Mac Modifier | IPv4 Address | IPv4 Modifier | IPv4 Prefix Length | IPv4 De Gateway |
|---|---|---|---|---|---|---|---|---|---|
| PortConfig1... | Host 1 | 1 | Ethernet/IP... | 00:10:94:00:00:01 | Step = 00:00... | 192.85.3.3 | Step = 0.0.0.1 | 24 | 192.85.1 |

FIG. 16

Host Interface | DHCP | DHCP Server | VPN

| Port Name | Host Name | State | Active | Session Host Name | Option Request List | Enable Relay Agent | Relay Agent Local IP | Relay Agent Local IP Step | Relay Agent Server IP |
|---|---|---|---|---|---|---|---|---|---|
| PortConfig1... | Host1 | Idle | ✓ | client @p-@b... | Subnet Mask, Do... | | | | |

FIG. 17

Host Interface | DHCP | DHCP Server | VPN

| Port Name | Host Name | Min Allowed Lease Time (secs) | Decline Reserve Time (secs) | Offer Reserve Time (secs) | Server Host Name | Pool Address Start | Pool Host Address Step | Limit Pool Host Address Count | Pool Host Address Count |
|---|---|---|---|---|---|---|---|---|---|
| PortConfig1... | Host1 | 10 | 10 | 10 | server @p-@... | 197.85.3.4 | 0.0.0.1 | | 251 |

METHOD AND DEVICE TEST DATA STREAMS BOUND TO EMULATED DEVICES

RELATED APPLICATION

This application is related to U.S. patent application Ser. No. 12/130,963, entitled "REALTIME TEST RESULT PROMULGATION FROM NETWORK COMPONENT TEST DEVICE" by inventors Brian Silverman, Abhitesh Kastuar Tom McBeath, and KaChon Lei, contemporaneously filed. This application is also related to U.S. patent application Ser. No. 12/130,854, entitled "METHOD AND APPARATUS FOR EMULATING NETWORK DEVICES" by inventor David Joyner, contemporaneously filed. The related applications are incorporated by reference.

BACKGROUND OF THE INVENTION

The technology disclosed includes a software architecture for methods and devices used to test routers, switches and the like, particularly high volume infrastructure devices. In particular, this architecture associates test data stream definitions with emulated devices that send test frames or packets to and receives them from a system or device under test ("DUT"). By relating the test data stream definitions to definitions of the emulated devices that are coupled to the DUT, automation of test frame and/or test packet design improves, especially where some of the information needed to generate test frames and/or packets is dynamically generated during a test.

Testing of network devices with a single test device is difficult because of the variety of test types, devices to test, interfaces to the devices, and control plane protocols that they run. These factors combine into test scenarios. Tests can be directed to conformance testing, functional testing, performance testing or passive testing, among others. Sample devices include routers, switches and hybrid devices. Typically, these devices are at the edge or core of a communications infrastructure such as the Internet or a carrier network. Interfaces to network devices include RJ-45 copper, fiber (single mode, multi-mode, SFP GBIC, and SFP MSA capabilities), XENPAK MSA, XFP MSA, X2 MSA and 10GBASECX4. Control plane protocols include BGP, DHCE, DHCP-PD, GRE, IGMP/MLD, L2TP, MEF9, MPLS/LDP/RSVP-TE, multicast routing, OSPF, PPPoX, RIP, STP/MSTP/RSTP, 802.1ah and 802.3ad. Data plane protocols include HTTP, FTP, Telnet, DNS, SSL, SMTP/POP3, IPSEC, IPv6, IPTV, SIP, and MMS.

Standards have been set for testing devices. Some of these standards are promulgated by ITEF following a request for comments procedure and are referred to by RFC number. Some of the test measurement standards include RFC-2544 and RFC-2889. Scenarios tested include VLAN Network Device Benchmarks, (between enterprise networks and with an enterprise backbone network), IPTV testing, Layer 2/3 switching and routing between enterprise networks and service provider networks, Spanning Tree Protocol behavior and performance upon failure of a route leg, multicasting expansion and propagation, Border Gateway Protocol router testing.

FIG. 1 depicts a sample test topology for layer 2-3 switching and routing between enterprise networks and service provider networks. The device under test sits between the networks. In this figure, the emulated enterprise network includes virtual LAN or "VLAN" segments. Traffic on the enterprise network includes voice, data and video. On the emulated service provider in our side of the DUT, sources of voice, data and video content are represented. The switching and routing devices in this scenario may support a large number of layer 2/3 technologies, including different virtual LAN encapsulations, various quality of service ("QOS") schemes, and dual-stack IPv6/IPv4 forwarding. Testing is particularly useful because each new feature or protocol increases the risk of functional or performance problems, many of which are hard to find without creating and analyzing a wide range of traffic scenarios.

The testing industry standard architecture for authoring test packets has involved authoring network sessions and raw test data packets, following a particular order that recognizes the dependencies between sessions that set up routes and establish addressing and the protocols that operate within the session context. For instance, in the TestCenter™ product v1.4 from Spirent Communications, a test engineer who was testing MPLS traffic would (1) define physical and logical characteristics of a port; (2) define upstream and downstream LDP ports and LSP sessions; (3) copy parameters, such as Forwarding Equivalence Class values and prefixes, from the upstream and downstream sessions into raw test data packets to be transmitted in the context of these sessions. To help organize the variety of port, protocol and packet choices to be made, authoring wizards have been provided at the scenario level. This approach is described more fully in Reference Manual, Spirent TestCenter™ System (August 2006), 134 pp., which is hereby incorporated by reference to illustrate the prior art approach and the variety of test scenarios addressed. The test set-up approach described in the Reference Manual has become familiar to and accepted by test engineers.

FIG. 2 depicts a tree of configuration options, including control plane protocols, implemented in the test center product version 1.4. Hardware components that present this tree of configuration options included high density network test chassis designated as SPT-9000A, SPT-5000A and SPT-2000A. A variety of test modules or cards can be mounted in these chassis. The first set of configuration options in FIG. 2 is for setup of cards, including setting up ports on cards and configuring ATM, VLAN and IP options on the ports. An alphabet soup list of control plane protocols is presented, including STP, BGP, OSPF, OSPFv3, RIP, IS-IS, RSVP-TE, LDP, I GMP and PIM. These control plane protocols each correspond to a network control session. The control plane protocols are presented for configuration of corresponding sessions. A user would expand a protocol choice, such as LDP, and configure one or more corresponding network control plane sessions. After configuring the control plane sessions, a user would expand the traffic tab, configure ports on the card as transmit and receive ports, and configure test frames or test packets in raw streams. The complexity of configuring test that include both control plane sessions and data plane raw streams can be imagined from the presentation of so many choices as individual special cases. A very simple approach to data structures has been used to represent network connections and data streams.

FIG. 3 depicts a network session object 311, a raw test packet object 313, 315 and corresponding test implementation objects 321, 323. The application configuration information 310 was entered on a PC or laptop that handled so called business layer logic. This configuration information was communicated to port 320 running on a firmware test module. The firmware test module was in the chassis, mentioned above, and include both general purpose computing logic and field programmable gate arrays (FPGAs) for high speed packet generation. In the software design structure depicted, a network session object and a raw test packet object represent distinct parts of the test. The details of the network session data structure were highly dependent on the particular network protocol involved. Network protocols were treated as special cases and handled by specialized code. While an LDP session 311 is depicted as communicating with a generalized routing daemon 321, in fact, specialized routing daemons were implemented on the test module for each type of network session. Raw test packet objects were constructed after network sessions, as address and label fields of the raw test packets were copied from the network session objects into the test frames. Test engineers developed significant skills while learning which raw test packet fields depended on which network session fields for the many special cases of network protocols. Some wizards were provided to assist with initial set-up consistency between network session and test packets set up, but test engineers were on their own for maintaining consistency once they began editing data fields generated using the wizard. A raw test packet 313 might, for instance, including Ethernet, MPLS and IP address information for both source and destination. The raw test packet information 313 would be provided to a generator 323 on a port 320 for packet generation. The data structures in this model correspond very literally with the network From the enormously complex array of choices presented, an opportunity has been realized to change the representation of components and the model for test configuration. A much different underlying representation may improve and simplify data entry, initial generation of prototype packets, dynamic discovery of address information, and updating address information during a test. More reliable and economical systems may result.

SUMMARY OF INVENTION

The technology disclosed includes a software architecture for methods and devices used to test routers, switches and the like, particularly high volume infrastructure devices. In particular, this architecture associates test data stream definitions with emulated devices that send test frames or packets to and receives them from a system or device under test ("DUT"). By relating the test data stream definitions to definitions of the emulated devices that are coupled to the DUT, automation of test frame and/or test packet design improves, especially where some of the information needed to generate test frames and/or packets is dynamically generated during a test.

BRIEF DESCRIPTION OF THE DRAWINGS

FIG. 6-7 depict parts of an interface for configuring a pair of emulated devices.

FIG. 8 depicts a traffic wizard and an initial step of selecting active ports.

FIG. 10 depicts MPLS binding of a test data stream to the endpoints.

FIG. 11 shows an MPLS bound connection after auto selecting the tunnel.

FIG. 15 depicts the host interface tab for configuring a host as a property of an endpoint.

FIG. 16-17 depict the DHCP and DHCP server tabs for configuring a host.

DETAILED DESCRIPTION

Figure 4:
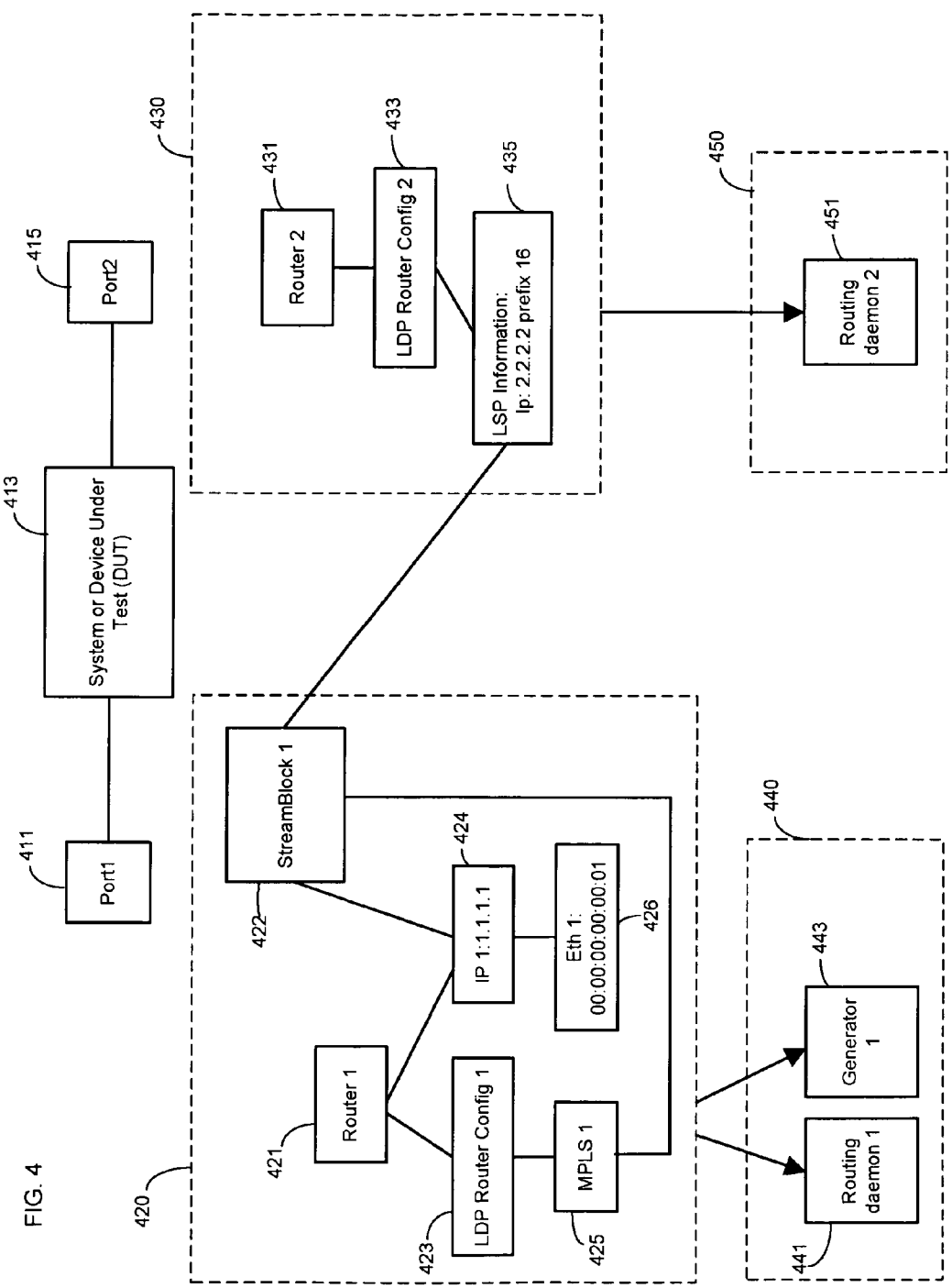
FIG. 4 depicts a novel abstraction of a test device and the devices that it emulates.

We disclose a structure for configuring and running tests, an improved interaction between computer and user, and related interfaces. The structure for configuring tests is object oriented and based on a novel abstraction of test devices. The observer pattern for object interaction, sometimes know as publish/subscribe, allows test stream objects bound to ports and their interfaces to learn of address information and updates that are to be applied to test packets. FIG. 4 is a high level block diagram that depicts interface objects, bound test streams and instrument layer objects including sample daemons. Three primary configuration objects illustrated represent an emulated ingress device on port 1 (420), an emulated egress device on port 2 (430) (collectively referred to as the "emulated devices") and a so-called bound stream block 422, bound to the source and destination of the test packets.

The top section of FIG. 4 depicts port one (411) and port two (415) emulating ingress and egress devices coupled to opposite sides of the DUT 413. As a figure indicates, either a system or device may be tested. In this application, we refer collectively to a system under test or a device under test as a DUT. The test device includes both ports one and two, as port two needs to know what packets to expect from port one. When the test device includes multiple ports operating at 10 Gb, it is most practical to communicate control information between ports via a bus, instead of a network connection between devices. Of course, the control protocol could be developed to communicate between ports on two different devices and a point-to-point networking protocol, such as fiber Channel, could be used to connect to devices that were hosting the two ports. However, it is much more practical for the single test device to include both ports.

The middle and lower section of FIG. 4 represents the business layer logic (BLL) and instrument layer logic (IL) of a test device. The test device includes hardware and software that implement features described herein. The test device may include one or more of logic arrays, memories, analog circuits, digital circuits, software, firmware and processors such as microprocessors, field programmable geared arrays (FPGAs), application-specific integrated circuits (ASICs), programmable logic devices (PLDs) and programmable logic arrays (PLAs). The hardware may be found in the chassis, card rack or integrated unit. It may include or operate with the console or the general purpose computer in communication with the test device. The test device may include a number of separate units that are clustered together or remote from one another. For some levels of testing and some components of an overall test setup, the test control may be implemented on a computer such as a personal computer, server or workstation. Typically, the BLL has been hosted on a laptop or PC and provided a user interface and control for a test chassis that included both general purpose CPUs and FPGAs. The FPGAs are responsible for data plane test packet generation. Some combination of hardware supports the BLL and IL logic.

FIG. 4 generally depicts a two port test with test packets moving from port one through the DUT. On port one (420) the emulated ingress device 421 is a router. It might alternatively be a switch or a hybrid device. In the MPLS enabled test depicted, the emulated device object 421 is coupled to network connectivity objects 423, and a stack of interface definition objects 424, 425, 426. The network connectivity objects include an LDP router configuration 423 and MPLS configuration information 425. The interface stack depicted includes IP (424) and ethernet or Mac address (426) objects. The network connectivity and interface stack objects publish their data to an observer that is part of the stream block object 422. The stream block object 422 corresponds to data streams that will be generated on port one (420), which is attached to an ingress port of the DUT.

The interface bound to the stream block object 422 subscribes to or observes data initially configured and later updated on the network connectivity and interface objects. Binding the stream block 422 to the source sets up the observer pattern, as does binding the stream block to a destination. On port two (430) the emulated egress device 431 also is a router. Again, it could be a switch or a hybrid device. The network connectivity objects connected to the router 431 include an LDP router configuration 433 and LSP information 435. These are the network connectivity objects for a downstream device that uses the MPLS label-based switching and routing protocol. When an MPLS session is initiated, the label distribution protocol (LDP) involves generating label switching protocol (LSP) information which is distributed from the downstream router through the device under test to the upstream router. The configuration objects at the BLL for the ports 420, 430 are in communication with so-called firmware at the IL. This firmware is more closely coupled to the physical ports of the test device than the BLL. In the upstream position, configuration objects are in communication with the routing daemon 441 and a generator 443. The routing daemon may actually be implemented as a series routing daemons for various protocols. The routing daemons may generate and/or receive routing address information. For instance, in an MPLS implementation, routing daemon 441 may listen for updated label information. When the routing daemon detects new label or address information, it publishes that information for other components. In one embodiment, the stream block or IP configuration object may observe the routing daemon for updated MPLS information. Then, the generator 443 may observe the interfaces 424, 425, 426 that are bound to the stream block 422 for updated IP information. In another embodiment, updated routing information may be directly forwarded from the routing daemon to the generator, as well is being published for the BLL objects to update themselves. At the firmware layer, the protocols illustrated in FIG. 4 require only a routing daemon 451 on port two 450.

In this testing configuration, only one stream block is depicted, corresponding to packets traveling from port one to port two. In actual testing, packets may be generated on each of port one and port two and sent to the other. Then, two or more stream blocks would be used. In general, high-volume testing uses stateless generation of test packets that are generated statelessly. That is, packets generated for port one depend only on the address or control plane information for port two and do not involve any request and response on the data plane between the ports.

We refer to stream block 422 as a bound stream block, in contrast to the raw stream blocks of earlier products. A bound stream block has source and destination bindings. By its bindings, the stream block is associated with both static information used to construct a prototype test frames or test packets, and dynamic address information that is generated by operation of the control plane. The process for learning information, using the observer pattern, involves different data and program structures than the old approach of using a wizard to fill in the same data in different data structures. The observer pattern has the additional advantage that updates to address information, which are a natural part of many test scenarios, and is dynamically propagated and quickly reflected in test packet traffic. Other processes for learning information, such as interprocess communications via pipes, could be used instead. Set up is greatly simplified by this novel object model and abstraction of the emulated devices.

Figure 18:
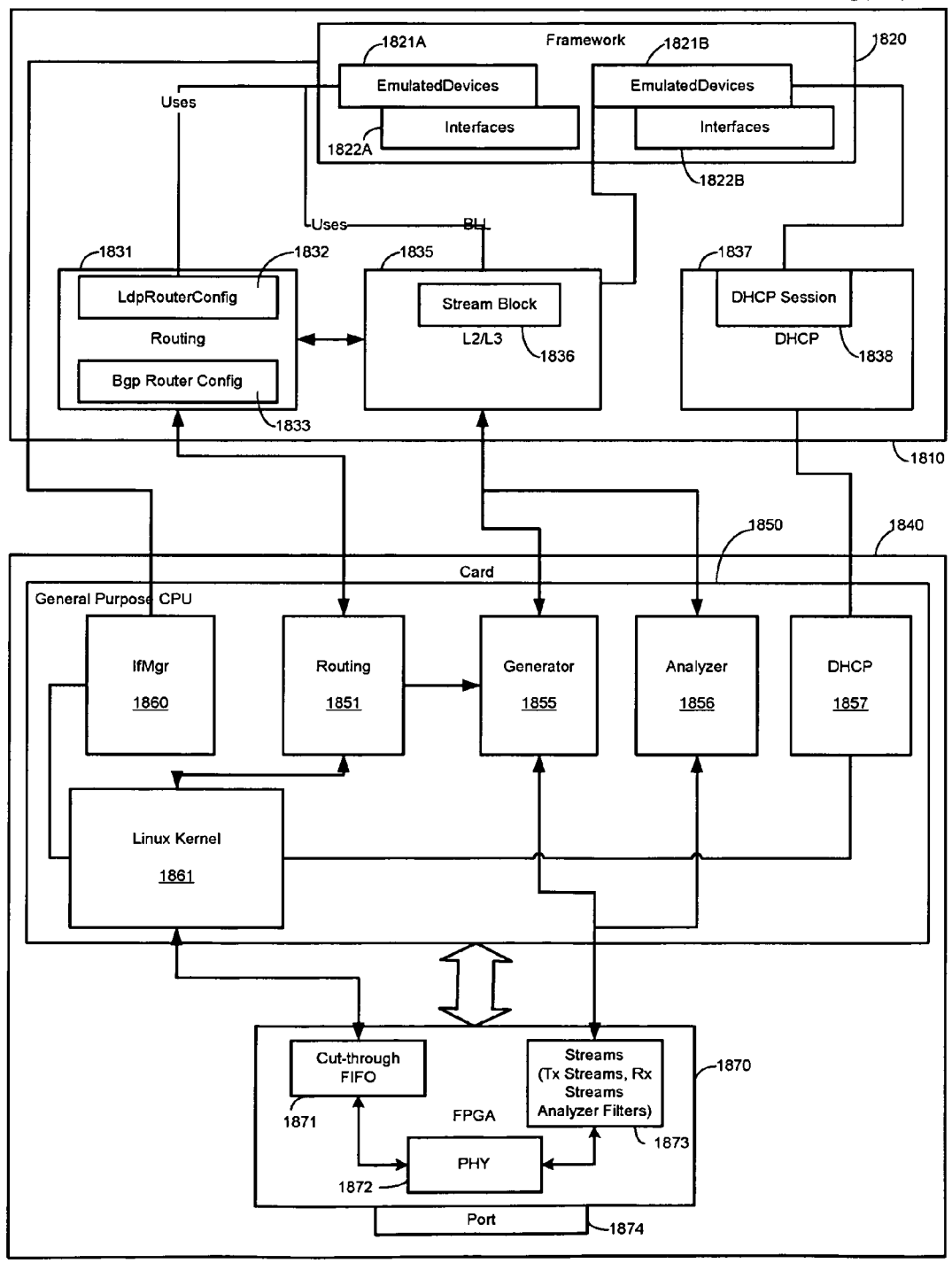
FIG. 18 is a high-level block diagram of a test device, with emphasis on software modules at levels of management logic and processing card logic.

FIG. 18 is a high-level block diagram of a test device, with emphasis on software modules at levels of management logic and processing card logic. The management logic 1810 in this embodiment runs on a separate computer coupled in communication with a chassis that holds processing cards 1840. For instance, the management logic can run on a laptop, desktop or workstation. Alternatively, the chassis of the test device could have a built-in processor and other resources or the chassis could accept a processor card that would run the management logic. Then, a terminal or monitor could be coupled to the chassis to manage data collection. The process and card logic of this embodiment includes components running on a general purpose CPU 1850, which are sometimes called firmware, and components implemented in an FPGA 1870, which are sometimes called hardware. As compared FIG. 4, this figure reveals more of the modular programming structure and less of the data structure.

The management logic 1810 includes a framework 1820 and components for routing 1831, layer 2/layer 3 tests frame generation 1835, and a DHCP host 1837. The framework is where the emulated devices 1821A, 1821B and their interfaces 1822A, 1822B are modeled. These emulated devices are comparable to 421, 431 in FIG. 4. The interfaces are comparable to 424, 425, 426. The routing component 1831 depicts support for two routing protocols, label switching protocol ("LDP") 1832 (see, e.g., RFC 5036) and border gateway protocol ("BGP") 1833 (see, e.g., RFC 4271). The routing component includes a collection of specific routing protocol hat are configured for specific devices. The routing component collects and publishes to the emulated devices routing information. The layer 2/layer 3 component 1835 includes bound stream blocks 1836 that define test frames. A bound stream block is bound to an ingress device 1821A and an egress device 1821B. It may be updated with routing information through one of the emulated devices or directly from the routing component. This figure adds a DHCP component 1837 that supports a DHCP session 1838. For instance, the emulated egress device 1821B may serve as a DHCP client. In general, the routing, layer 2/layer 3, and host components in the management logic have corresponding components in the processing card logic 1840 running on the processor 1850. Routing component 1831 as a counter part routing component 1851. Stream block component 1836 has counterpart generator 1855 and analyzer 1856 components for the ingress and egress ports, respectively. DHCP component 1837 has a corresponding DHCP component 1857. The routing, generator, analyzer, and DHCP components running on the processor are implemented, in one embodiment, by respective daemons per processing card. A large number of emulated devices and their interfaces can be handled by a single routing component 1851 and a single DHCP component 1857. Alternatively, additional routing components and DHCP components could be allocated. The component IfMgr 1816 is an internal object that manages network interfaces and validation of interfaces. It is an automatically created child of the test configuration root. The IfMgr, routing component, and host component interact with the Linux kernel. These components generate control plane packets via the Linux kernel. The generator 1855 and analyzer 1856 components operate in the data plane of the ingress port and egress port, respectively. They process test frame descriptions available from the bound stream block 1836. In some embodiments, routing information learned at the routing daemon 1851 may be passed directly to the generator daemon 1855, in addition to being propagated upwards to the management logic 1810. The generator and analyzer demons interact with the streams components 1873 of the FPGA.

On the FPGA 1870, control plane data is handled by a cut through FIFO 1871 that interacts with PHY, which schedules transmission of the control plane packets across the port 1874. A cut through FIFO is appropriate because the FPGA processing of control plane packets is minimal. On the other hand, data plane test frames and packets are the primary reason for use of an FPGA. Details of the FPGA streams components 1873 are beyond the scope of this disclosure. The streams components 1873 build test frames to be sent across PHY 1872 and the port number 1874 and processes test frames received across these components.

Overall, from FIG. 18, one sees an example of architectural detail for which bound stream blocks are particularly useful.

Figure 1:
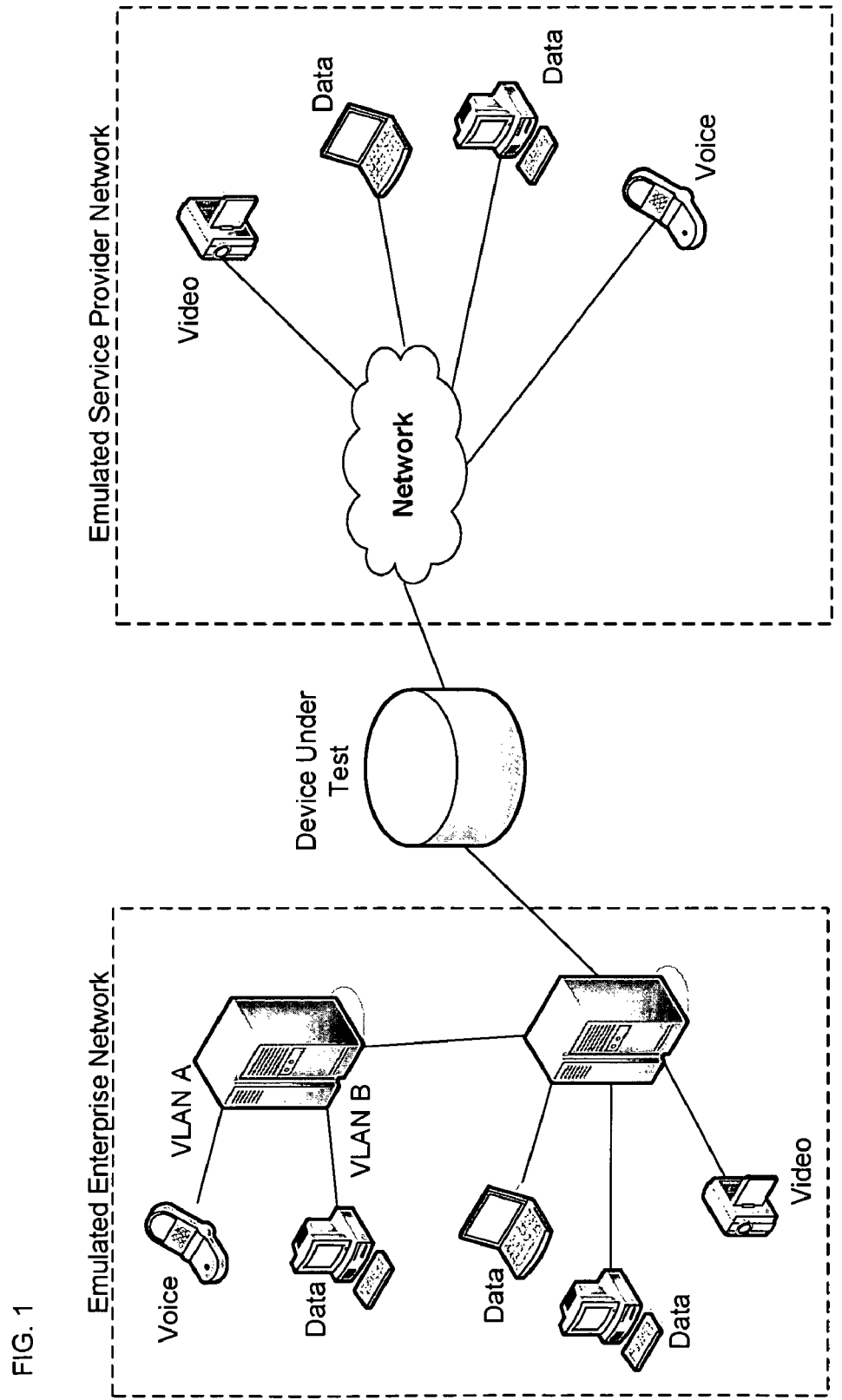
FIG. 1 depicts a test scenario where the system or device under test ("DUT") sits between an emulated enterprise network and an emulated service provider network.
Figure 2:
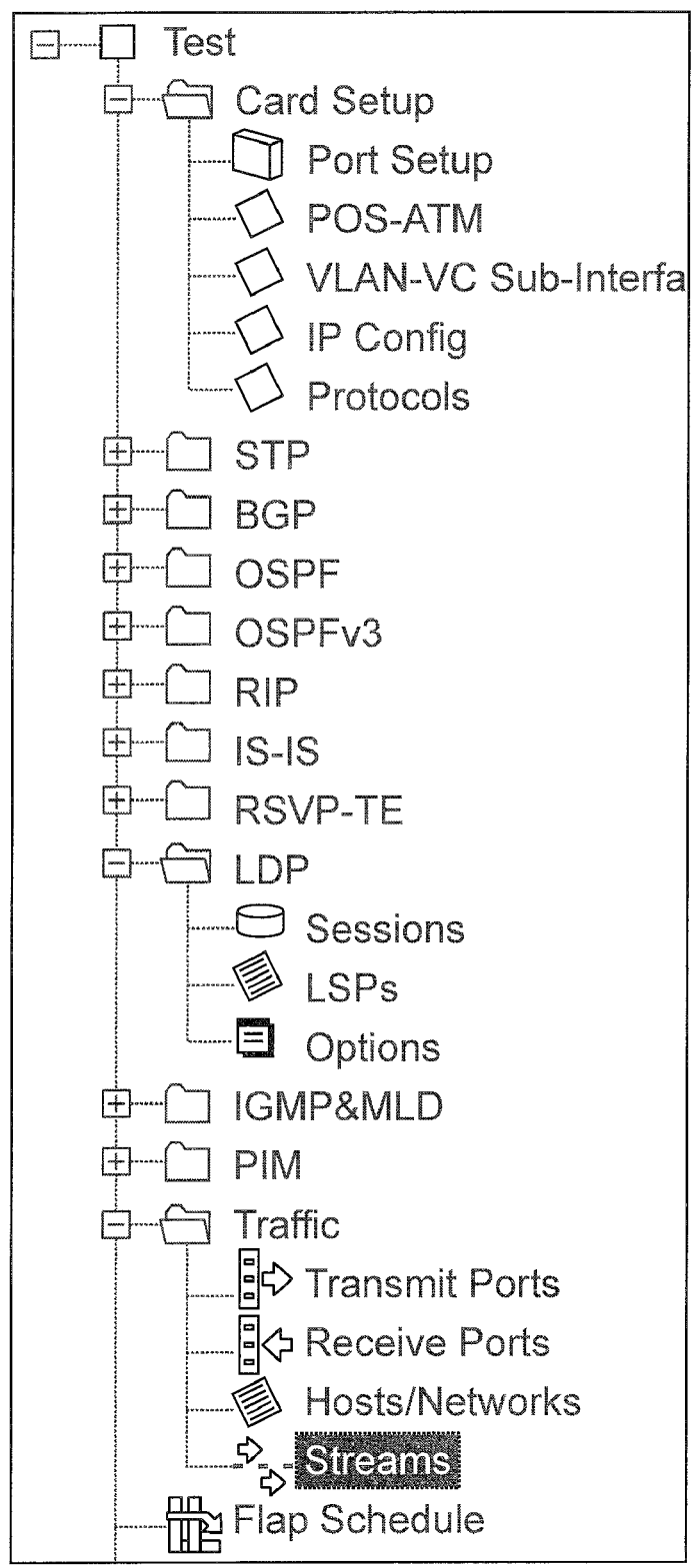
FIG. 2 depicts a test configuration interface in the prior art.
Figure 3:
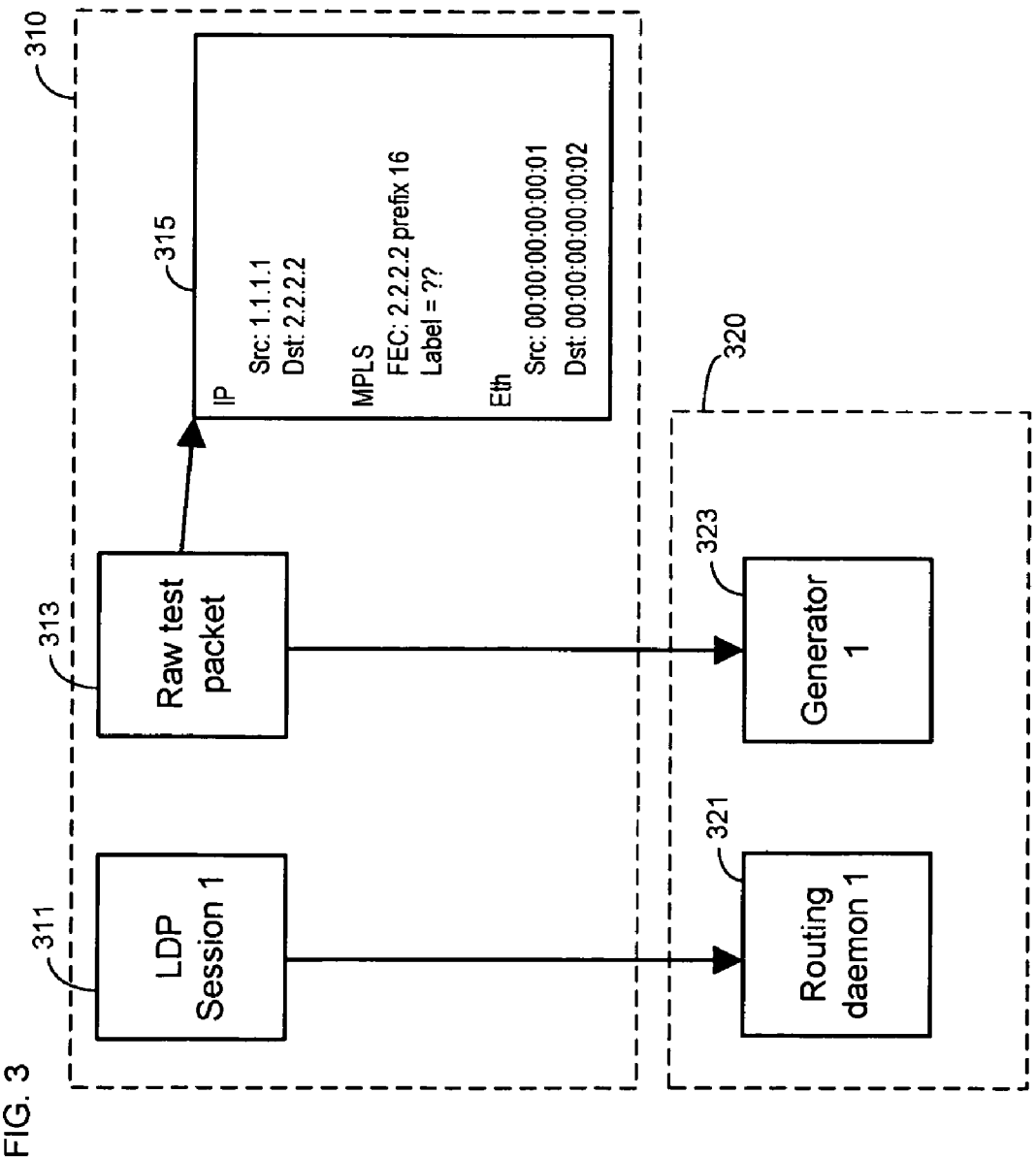
FIG. 3 depicts data structures that can be configured using the options depicted in FIG. 2.
Figure 5:
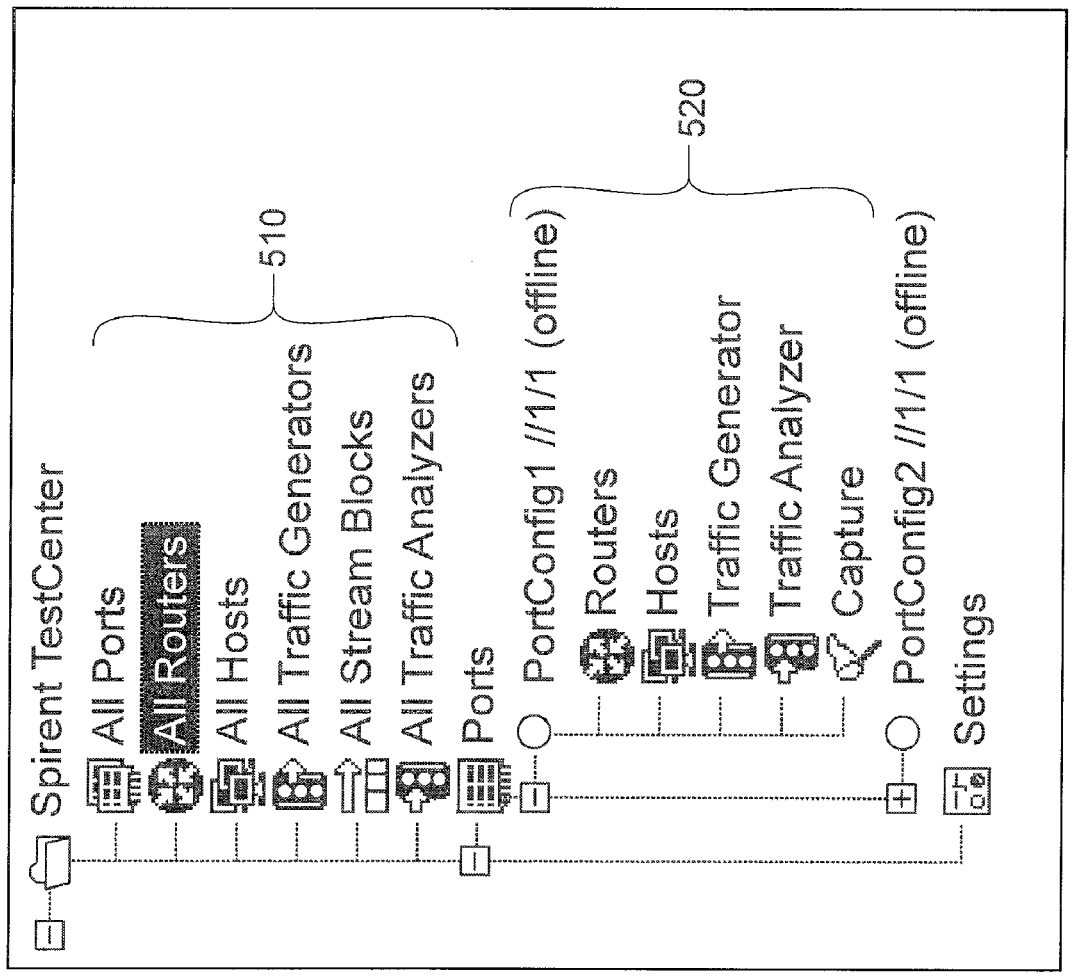
FIG. 5 depicts a test configuration interface corresponding to the abstraction in FIG. 4.

FIG. 5 depicts the tree of objects—routers, hosts, traffic generators, traffic analyzers and capture—that are configured with a consistent look and feel and handling of objects across control plane protocols. In contrast to the ad hoc configuration approach in FIG. 2, the configuration tree of FIG. 5 consistently models the protocols emulated during testing of a system or device under test (a "DUT").

The test configuration in FIG. 5 can be treated in two parts: a system block 510 applies generically; active ports 520 apply to a specific project or test. Configuring a stream block within a project or test involves building data objects is depicted in FIG. 4.

A stream block describes the data plane frame content, including the frame header and payload. It also contains relationships to objects that represent other components in the system, such as network interfaces and protocol configurations. Attributes of a stream block may include State, StreamBlockIndex, StreamIndex, EnableArp, IsArpResolved, TrafficPattern, IntraBlockMapping, UseStreamForFlow, BiDirectionalTraffic, EqualRxPortDistribution, EnableControlPlane, InsertSignature, FrameLengthMode, FixedFrameLength, MinFrameLength, MaxFrameLength, StepFrameLength, FillType, FillConstant, BurstSize, Ifg, StartDelay, Priority, Load, LoadUnit, LoadAsPercentage, LoadAsFps, LoadAsIbg, LoadAsBps, LoadAsKbps, and/or LoadAsMbps. The names of these attributes are generally self-explanatory. A user specifies source and destination binding relationships between a stream block and endpoints. Creating the binding specifies data paths between the endpoints. Combined with the traffic pattern, the data path determines the prototype for a data plane test frame. Data in a test frame will be sent along to configure data path. Creating the binding also creates a dynamic relationship between the endpoints and address fields in the data. For example, when a source of stream block is bound to a DHCP session, source IP address information learned in the DHCP session will be used in test data packets. Following binding, information learned from the endpoints takes precedence over information manually specified, except if the system is intentionally creating error conditions. In general, if a prototype test frame contains an IP header and the stream block is bound to an IP network interface, the IP address information in the network interface will be used when data plane traffic is created. Intra-block mapping between ingress and egress ports may be set to one-to-one or one-to-many.

Returning to FIG. 5, a stream block can be placed under either to the system section 510 of configuration or attached to a particular port 520 to implement a project. When a stream block is created at the system or project level, the source bindings of the stream block can be connected to multiple ports. In one mode, a read-only port level stream block object will be created. The system uses this port level stream block object to retrieve information used in a test. In another mode, the project level stream block is treated as a prototype. When assigned to a port, an editable copy of the project level stream block is created, which becomes unsynchronized with the project level stream block.

The stream block authoring process, which produces flows within streams and permits chaining of modifiers, includes richness which is beyond the scope of this disclosure. This disclosure is more focused on the binding of stream blocks to endpoints than on the modifiers that create variation within the stream block traffic.

For a particular active port number 520, configuration options include routers, hosts, traffic generation, traffic analysis and data capture. The routers, hosts and traffic generation are explained in figures that follow. Traffic analysis and data capture are beyond the scope of this disclosure. FIGS. 6-7 depict configuring ports on interfaces for a pair of emulated devices. Configuration of ports precedes creation of stream blocks using the traffic wizard. FIG. 6 depicts the router interface tab 601 to be all ports in the system section 510 of test configuration as depicted in FIG. 5. Configuration of two ports 611, 621 is depicted. Properties of a port include a router name (which may be a switch name), a packet encapsulation, a source MAC address, a router ID, IPv4 address, IPv4 prefix length, IPv4 default gateway and an option for resolving an IPv4 Gateway MAC address. Other tabs for router configuration invite a user to specify virtual private network, resource Reservation protocol—including traffic engineering—Label Distribution Protocol (LDP), and routing protocols known as Intermediate System to Intermediate System (IS-IS) routing, Open Shortest Path First (OSPF), Border Gateway Protocol (BGP) and Routing Information Protocol (RIP). Several of the routing protocols include multiple versions. In this disclosure, we will follow through with an example that uses multiprotocol label switching (MPLS) and label distribution protocol (LDP).

FIG. 7 depicts the LDP tab 701 for router configuration. Some of the attributes for the label distribution protocol which are configurable and depicted in FIG. 7 include: whether the LDP protocol is active, the router state, the low type, the transportation mode, the DUT IP address, the low interval, the keep alive interval, whether to enable BFD, and a label space ID. Other appropriate configuration options for this and other aspects of the router interface definition also are supported.

Configuration of source and destination ports makes the system ready for the traffic wizard, which sets up at least one stream block and its bindings.

FIG. 8 depicts a traffic wizard and an initial step of selecting active ports. Having created two ports, as depicted in FIGS. 6-7, the first step in executing the traffic wizard is to create a project using some active ports, for which interfaces have been configured.

Figure 9:
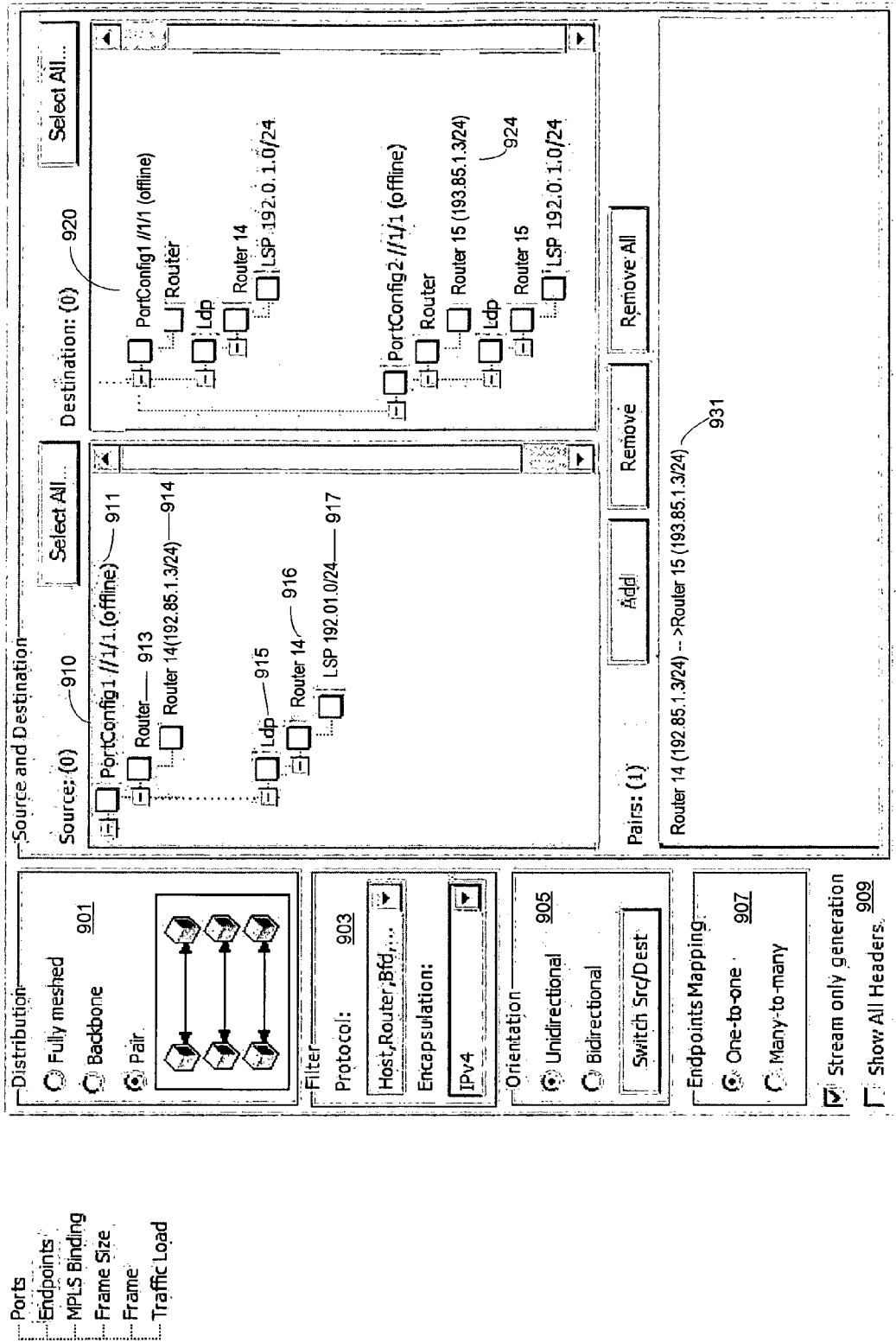
FIG. 9 depicts an interface for selecting endpoints.

FIG. 9 depicts an interface for selecting endpoints. One option is for distribution of packets 901. Three options are given and the currently selected option is graphically depicted. The simplest option is "pair" which results in source and destination windows 910, 920 being displayed. The backbone distribution also displays two windows for test of the backbone device with packets distributed from all of the source ports to all of the destination ports. In this context a backbone network may be the Internet backbone or backbone networks of commercial, educational or government organizations. Some of the large companies that provide backbone networks include Verizon, British Telecom, AT&T, Sprint Nextel and Global Crossing. Backbone networks are redundant, high-capacity trunks that carry data across countries, continents and/or oceans. The third distribution option is fully meshed. In a fully mashed distribution, only one window of sources and destinations is shown, because all selected ports interact with all other ports. Options for filtering 903 by protocol and encapsulation also are provided. The protocol is one of the network connectivity configuration options. The encapsulation is the type of interface being set up. The orientation option 905 determines whether a single set up of stream blocks is created or a bidirectional pair of stream blocks. The bidirectional pair is an option that we discussed above in the context of FIG. 4. For the user's convenience, the orientation options include reversing source and destination designations. When the distribution option is pairwise, and endpoints mapping option 907 allows the user to select one-to-one or many-to-many. A combination of y-directional and many-to-many endpoint mapping for pairwise distribution would produce the same distribution pair as a backbone option. Additional option 909 allows stream only generation, to override generation of flows within streams, so that separate streams are created for each variation in traffic. This impacts the granularity of data collected. The show all headers option reveals lower level headers that otherwise would be hidden. For instance, when IP to IP traffic is being tested, the packet headers at layers lower than IP, such as MPLS/LPS and Eth headers are normally hidden.

Three windows are depicted in FIG. 9, four source ports 910, destination ports 920 and connections that have been made between sources and destinations 930. The configured port 911 in this option has both router configurations 913 and LDP configurations 915, because this is an MPLS example. If the router 914 is selected, it carries with it IP address information. If the network configuration for the router 916 is selected, it carries with it forwarding equivalence label information 917. In this figure, router 14 (914) and router 15 (924) were selected as source and destination. When the user selected the add button, a pair was created 931 which is depicted in the pairs window 930.

FIGS. 10-11 depict MPLS binding of a test data stream to the endpoints. When the wizard proceeds to MPLS binding, the selected source and destination pairs 931 are displayed 1011, because the stream block has already been bound to its source and destination. All a user does is click on the auto select tunnel button 1005. FIG. 11 depicts the bottom label information 1117 that is automatically supplied from previously entered LDP router configuration information.

Figure 12:
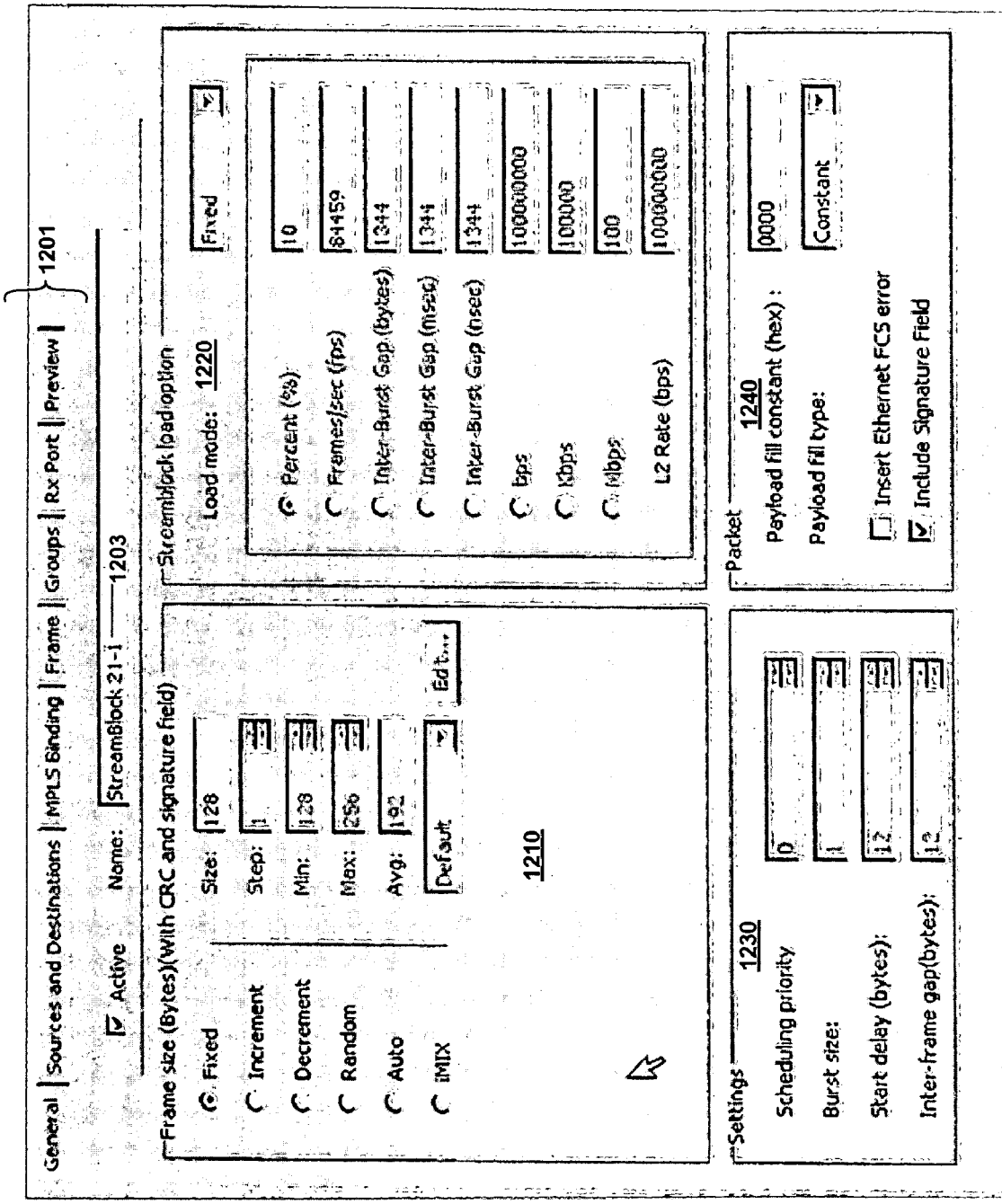
FIG. 12 depicts some settings of a test stream block that has been automatically configured based on the binding between a stream block object and its endpoints.

FIG. 12 depicts some settings of a test stream block that have been automatically configured based on the binding between a stream block object and its endpoints. The stream block editor reveals the detail of a particular test stream block. Several tabs 1201 provide access to different features of the stream blocks: general, sources and destinations, MPLS binding, frame, groups, receive port and frame preview. FIG. 12 depicts the general features. In the settings 1230 and stream block load option 1220 portions of the tab, choices are grayed out. This indicates that those choices were completed using the wizard and are not currently available for editing. This might be the case, for instance, when a prototype stream block has been assigned on a read-only basis to a particular port. A stream block has a name 1203 and may be active or not. It has a frame size 1210 which may be fixed, incremented, decremented, random, automatically selected or of mixed size. A variety of stream block loads can be generated 1220. They can be generated as a function of the channel capacity, timing, or actual load. For instance, the load can be 10% of the layer 2 capacity of the channel. Alternatively the number of frames per second or bits, kilobits or megabits per second can be selected. A gap between packets can be set in terms of bytes, milliseconds or nanoseconds. The load can be fixed, incrementing, decrementing, random or mixed. Settings for test frame 1230 include scheduling priority, burst size, start delay (in bytes) and inter-framed gap (in bytes), which relate to the characteristics of the test traffic. Packet options 1240 include payload fill constant, fill type, error testing and signature field options. A signature field allows individual packets originating in a first port to be identified and accounted for at a second port. Payload fill creates a pattern of dummy payload data that may easily be recognized.

Figure 13:
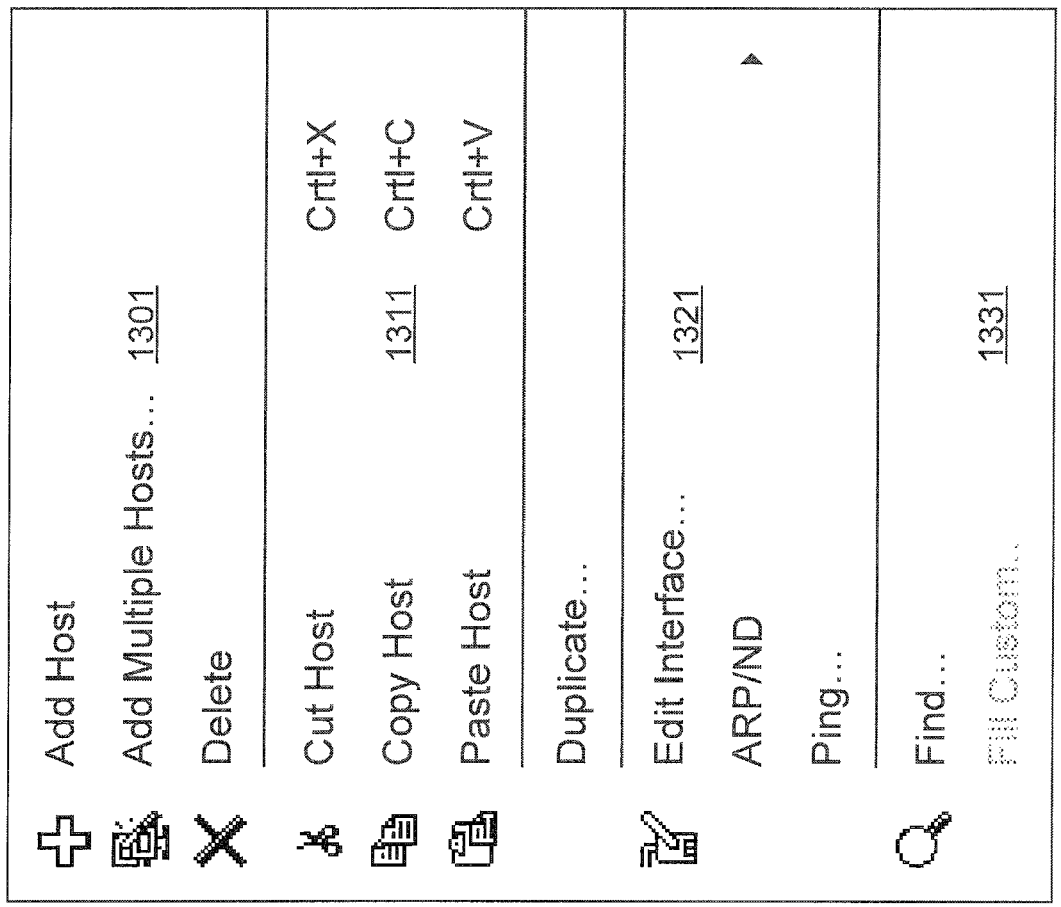
FIG. 13 depicts a pop-up menu that facilitates adding a host to an endpoint configuration.

FIG. 13 depicts a pop-up menu that facilitates adding an emulated host device to a test port. This figure, combined with FIGS. 14-17, adds a so-called host feature to an endpoint. The pop-up menu choices include adding and deleting hosts 1301, cutting, copying and pasting or duplicating hosts 1311, technical features related to implementing a host 1321. These features support editing of interface characteristics of the emulated device, initiation either ARP/neighbor discovery to learn IP gateway MAC address and initiation of ping sequences from the emulated device 1331. The following FIGS. 14-17 illustrate adding a host.

Figure 14:
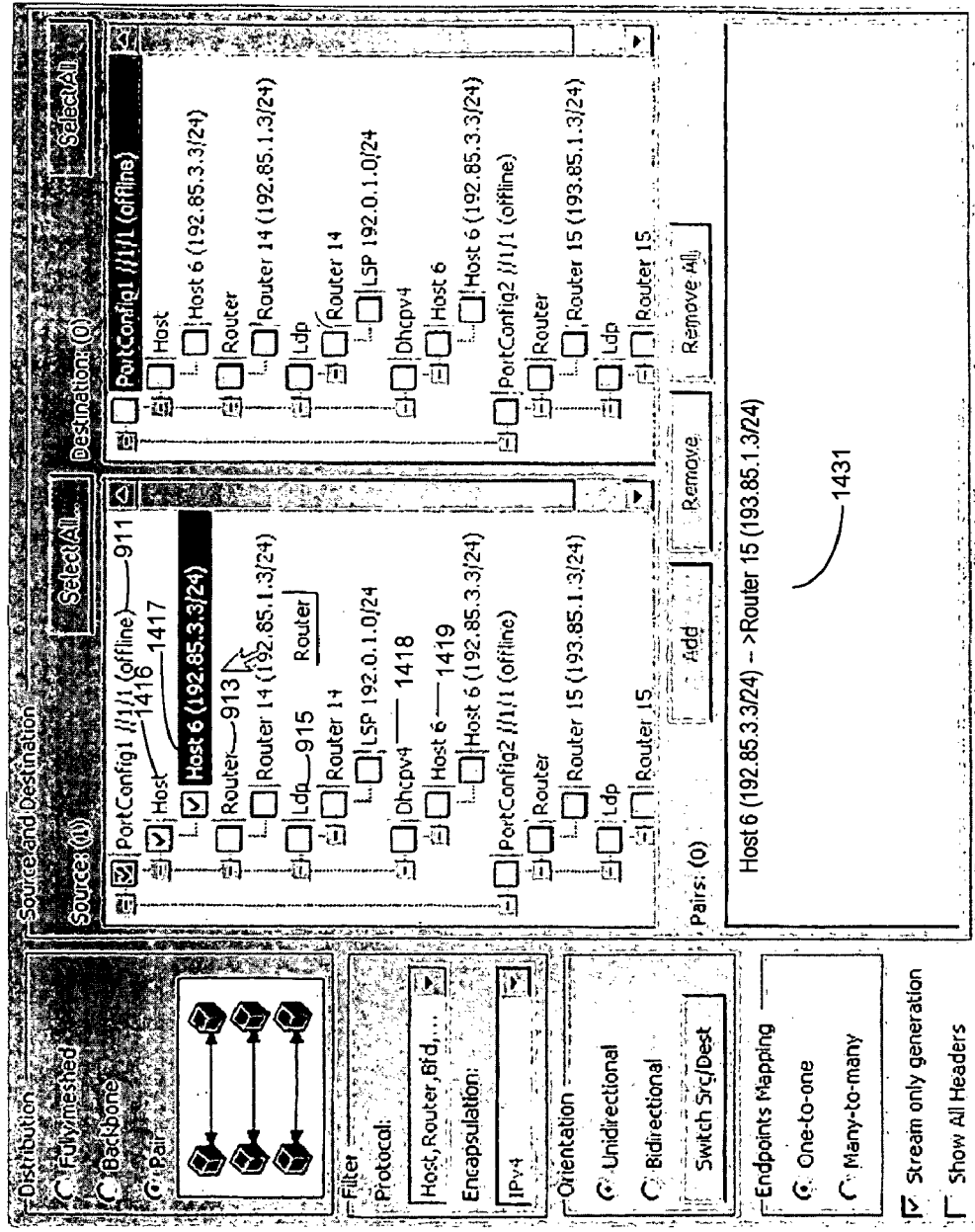
FIG. 14 depicts linking a host endpoint to a router endpoint, with a DUT between them.

FIG. 14 depicts linking a host endpoint to a router endpoint, with a DUT between them. A host, once created, can be bound to a stream block using this variation on FIG. 9. There are two host-related entities, a host 1416 such as DHCPv4 1418. Either the host or the addressing information associated with the host can be selected 1416, 1417. Similarly, either the DHCP server 1418 or information associated with the DHCP server 1419 can be selected. As illustrated, host 6 has been selected as a source and router 15 as destination. The user selected the add button and the selected pair of source and destination was added to window 1431. This illustrates one embodiment of binding an endpoint that has a host feature to a stream block.

FIG. 15 depicts the host interface tab for configuring a host that relates to an endpoint. The panel for configuring a host includes tabs for the host interface, DHCP, DHP server and virtual private network 1501. A port is represented in a row 1511. Features of a port shown under the host interface tab include host name, host count, encapsulation type, source Mac address, source Mac modifier, IP address, IP modifier, IP prefix length, IP default gateway, etc. Using this tabbed GUI, the port can easily be configured to present the appearance of multiple hosts at selected Mac and IP addresses.

FIGS. 16-17 depict the DHCP client and DHCP server configuration tabs. Features presented by the DHCP tab cover the behavior of the DHCP client. Those features include whether DHCP is active, state, a host name (presented here in parametric form), request options, and several attributes of a relay agent. The counterpart to the DHCP client is a DHCP server, as depicted in FIG. 17. Features that appear in this embodiment include minimum allowed lease time in seconds, time before declining reserve lease, time before offering to reserve a lease, server hostname, IP address pool start and stop, whether to limit the pool host address count and the number of available addresses in the pool host.

Some Particular Embodiments

The technology disclosed can be practiced as a computer implemented method of automatically constructing test frames to test a network system or device. It also can be practiced as a device including features disclosed or as an article of manufacture, such as a storage medium including program instructions adapted to carry out the methods described.

One embodiment is a method of automatically constructing test frames to test the switching, bridging or routing device. These devices may be referred to as the device or system under test or "DUT". The environment in which this method is applied also may include a collection of devices under test forming a system under test. The method operates on a test device that generates test frames and has at least first and second ports that are adapted to be coupled ports of the DUT during a test. The method includes eliciting and receiving from a user descriptions of at least one virtual ingress device emulated on the first port and at least one virtual egress device emulated on the second port. This pair of emulated devices is referred to collectively as "emulated devices." The user descriptions of the emulated devices includes interface types and interface configurations on the emulated devices. Examples of interface types include IP, MPLS and Ethernet interfaces. Examples of interface configurations include IPv4, IPv6, MPLS, Ethernet, VLAN, GRE, ITAG, L2TP(v2/3), PPP, PPPoX, WiMax, HDLC, AAL5, POS, IpSec, MacSec (802.1ae, 802.1af), and Fiber Channel. The user descriptions further include any interface address configurations that are dynamically learned using interface setup protocols. For a switch or router, dynamic learning might be accomplished using industry standard routing or switching protocols known as STP (and its variants), OSPF, RIP, BGP, LDP, BFD, EOAM, IS-IS, LACP, PIM, or RSVP.

The method further includes receiving any device configuration required for the test device and DUT to set up network connectivity. Examples of device configuration information related to setting up network connectivity include configuration for spanning tree protocols, such as STP, MSTP or RSTP. Other examples include OSPF, RIP, BGP, LDP, BFD, EOAM, IS-IS, LACP, PIM, and RSVP. The method further includes automatically building prototype test packets to transmit between the emulated devices through the DUT, using the received descriptions of the emulated devices. A stream block definition may be statically bound to the emulated devices that serve as a source for static information used to build prototype test packets.

The method includes starting one or more network emulation systems to establish network connectivity between the emulated devices in the DUT and learning at the emulated devices at least some dynamically generated address information. In some embodiments, the learning at the emulated devices takes place in a routing daemon. This routing daemon may run on a CPU or on dedicated hardware. The dynamically generated address information may for instance be IP address information supplied by a DHCP host. The method proceeds by automatically combining the prototype test packets and the dynamically generated address information to produce a multiplicity of test packets. These tests packets are transmitted between the emulated devices through the DUT.

According to one aspect of this method, the interface types may be one or more of IPv4, IPv6, MPLS, Ethernet, VLAN, GRE, ITAG, L2TP(v2/3), PPP, PPPoX, WiMax, HDLC, AAL5, POS, IpSec, MacSec (802.1ae, 802.1af), Fiber Channel. The interface configuration information depends on the interface type. For IPv4 or IPv6, the interface configuration includes a static or dynamic IP address of the emulated device and a static or dynamic gateway IP address. For the MPLS interface, the interface configuration includes at least one MPLS label. For a PPPoE or PPPoEoA interface (collectively allows with related raviants, "PPoX"), the interface configuration includes at least a session ID. For the Ethernet interface, the interface configuration includes at least a MAC address. Some of this interface configuration information is supplied dynamically using a setup protocol. For IPv4 or IPv6 configuration, the set up protocol for a dynamic IP address may be DHCP or PPP. For the MPLS configuration, the setup protocol for an MPLS label may be LDP. For other interfaces, which have interface address configurations that are dynamically learned using interface set up protocols, the method exercises, as appropriate to the interface, one or more of PPPoX, L2TP, WiMax, IpSec, MacSec, or Fiber Channel. According to a further aspect of the method, the device configuration received for the test device and the DUT to set up network connectivity may be one or more industry standard routing or switching protocols known as STP (and its variants), OSPF, RIP, BGP, LDP, BFD, EOAM, IS-IS, LACP, PIM, RSVP.

A different aspect of the method elaborates on automatically building prototype test packets. This building further includes linking at least one data test stream object with software objects representing the emulated devices and/or the interface configurations on the emulated devices. It further includes configuring a load of sessions and session parameters on the data test stream object, consistent with the interface types of the emulated devices. Building upon this aspect, the method optionally extends automatically combining the prototype test packets and the dynamically generated address information. It further includes registering the interfaces bound to the data test stream object to publish changes in the interface configurations and device configuration related to the emulated devices. The objects publish a change during the test, and the dynamically generated address information being used to generate the multiplicity of test packets is automatically updated. An alternative for building upon the data test stream object architecture involves automatically combining the prototype test packets and the dynamically generated address information. This alternative includes processing a message indicating a change in the interface configurations and device configuration related to the emulated devices, during the test. It further includes automatically updating the dynamically generated address information being used to generate the multiplicity of test packets.

The method described can be practiced for various devices, including routers and switches. According to one aspect, the DUT is a routing device. The device configuration required for the test device and DUT to set up network connectivity is obtained by exercising one of the protocols known as STP, BGP, OSPF, OSPFv3, RIP, IS-IS, RSVP-TE, LDP, IGMP and PIM Protocols. Alternatively, the DUT is a switching device. The device configuration required for the test device and a switching DUT to set up network connectivity may be a spanning tree protocol. The method includes exercising one or more industry standard routing or switching protocols known as STP (and its variants), OSPF, RIP, BGP, LDP, BFD, EOAM, IS-IS, LACP, PIM, RSVP.

A device embodiment of the technology disclosed automatically constructs test frames to test the switching, bridging or routing device referred to as a device or system under test or "DUT". (The lists of protocols given for the method embodiment apply to the device embodiment, as well.) The DUT has ports. The test device includes at least two ports, adapted to be coupled in communication with ports on the DUT. It includes logic and resources that process objects, which store data and implement methods, and that run daemon processes. Software components of the test device include ingress and egress device emulation objects coupled to the ports. The ingress and egress objects are collectively referred to as the "emulated device objects". The software components also include a stack of interface definition objects linked to the emulated device objects. The interface definition objects include interface type identifiers and interface configurations. Examples of the interface type identifiers include IP and Ethernet. Examples of the interface configuration include IP and Mac address. The interface definition objects dynamically receive any interface addresses for the interface configurations using interface setup protocols. For switch, examples of interface setup protocols include DHCP, PPPoE, PPP, PPPoEoA, and L2TP. Other lists appear in the claims. The software components further include one or more network connectivity protocol objects, also linked to the emulated device objects. The network connectivity protocol objects include configuration information required for the test device and DUT to set up network connectivity. In addition, the software components further include one or more stream block objects bound to at least the interface definition objects. The stream block objects define test frames that prototype test packets to be sent by the emulated ingress device to the emulated egress device via the DUT during a test.

According to one aspect of the test device embodiment, the interface type identifiers supported include at least IPv4, IPv6, MPLS and Ethernet. The interface type identifiers may be extended with interface configuration that includes, for the IPv4 or IPv6 interface type, a static or dynamically learnt IP address of the emulated device and a static or dynamic gateway IP address. For the MPLS interface type, the interface configuration includes at least one MPLS label. For a PPPoE or PPPoEoA interface, the interface configuration includes at least a session ID. For the Ethernet interface type, interface configuration includes at least a MAC address. This aspect can be further extended with particular interface set up protocols, including, for the IPv4 or IPv6 interface types, supporting at least a DHCP protocol. For the MPLS configuration, the set up protocol supported for an LSP label may be LDP, BGP, RSVP or other protocols that IETF defines from time to time. For other interfaces, which have interface address configurations that are dynamically learned using interface set up protocols, the method exercises, as appropriate to the interface, one or more of PPP or L2TP.

An alternative extension for the interface types and interface configuration involves the data test stream objects being further bound to the network connectivity protocol objects and the network connectivity protocol objects supporting at least DHCP for dynamic IP address information, and LDP for LSP/MPLS label information.

The different aspect of the test device embodiment includes the data test stream objects further comprising data for a number of sessions and session parameters that control the test consistent with the interface types of the emulated devices. This aspect may be extended wherein the data test stream objects are further adapted to register the data test stream objects to observe changes in the interface configurations and device configuration related to the emulated devices. When the data test stream objects observe one or more changes during a test, they automatically update the dynamically received interface addresses used to generate the multiplicity of the test packets. Very quickly, the test packets being generated reflect the updated dynamic address information.

As an article of manufacture, a further embodiment is a computer readable storage media including program instructions to carry out a method of automatically constructing test frames to test a switching, bridging or routing device. Repeating and incorporating by reference the description above, the method operates on a test device that generates test frames and has at least first and second ports that are adapted to be coupled ports of the device under test (DUT) during a test. The program instructions provide for soliciting and receiving from a user descriptions of at least one virtual ingress device emulated on the first port and at least one virtual egressed device emulated on the second port. The user descriptions of the emulated devices includes interface types and interface configurations on the emulated devices. The user descriptions further include any interface address configurations that are dynamically learned using interface setup protocols. The program instructions are further adapted to receiving any device configuration required for the test device to set up network connectivity and automatically building prototype test packets to transmit between the emulated devices through the DUT, using the received descriptions of the emulated devices. The program instructions include starting one or more network emulation sessions to establish network connectivity between the emulated devices and the DUT, and learning at the emulated devices at least some dynamically generated address information. The dynamically generated and learned address information is automatically combined with the prototype test packets to produce a multiplicity of test packets. These test packets are transmitted between the emulated devices through the DUT.

Another article of manufacture is useful to construct a test device that automatically constructs test frames to test DUTs. This article of manufacture is a computer readable storage media including program instructions that can be loaded to complete a test device with useful features. This article of manufacture could usefully be combined with a chassis, processing cards, a server or another computer based device. Repeating and incorporating by reference the device description above, program instructions on the storage media include ingress and egress device emulation objects adapted to be coupled to ports of the test device. The program instructions also include a stack of interface definition objects linked to the emulated device objects. The interface definition objects include interface type identifiers and interface configurations. The interface definition objects dynamically receive any interface addresses for the interface configurations using interface setup protocols. The program instructions further include one or more network connectivity protocol objects, also linked to the emulated device objects. The network connectivity protocol objects include configuration information required for the test device and DUT to set up network connectivity. In addition the instructions include one or more stream block objects bound to at least the interface definition objects. The stream block objects defined test frames which prototype the test packets to be sent by the emulated ingress device to the emulated egress device via the DUT during a test.

The article of manufacture embodiments may be combined with the aspects and options of the methods and devices which are described above. All of those aspects and options apply equally to articles of manufacture that include program instructions to practice the method or to construct the device as they do to the method or device.

While the present invention is disclosed by reference to the preferred embodiments and examples detailed above, it is understood that these examples are intended in an illustrative rather than in a limiting sense. It is contemplated that modifications and combinations will readily occur to those skilled in the art, which modifications and combinations will be within the spirit of the invention and the scope of the following claims.

We claim as follows:

1. A method of automatically constructing test frames to test a switching, bridging or routing device (referred to as the "device or system under test" or "DUT"), the test frames generated by a test device that has at least first and second ports that are coupled to ports on the DUT, the method including:

eliciting and receiving from a user descriptions of at least one virtual ingress device emulated on the first port and least one virtual egress device emulated on the second port (referred to collectively as "emulated devices"), including interface types and interface configurations on the emulated devices, further including any interface address configurations that are dynamically learnt using interface setup protocols;

further receiving any device configuration required for the test device and DUT to set up network connectivity;

automatically building prototype test packets to transmit between the emulated devices through the DUT, using the received descriptions of the emulated devices;

starting one or more network emulation sessions to establish network connectivity between the emulated devices and the DUT and learning at the emulated devices at least some dynamically generated address information automatically combining the prototype test packets and the dynamically generated address information to be used when producing test packets; and transmitting a multiplicity of test packets between the emulated devices through the DUT.

2. The method of claim 1, wherein the interface types are one or more of IPv4, IPv6, MPLS, Ethernet, VLAN, GRE, ITAG, L2TP(v2/3), PPP, PPPoX, WiMax, HDLC, AAL5, POS, IpSec, MacSec (802.1ae, 802.1af), and Fiber Channel.

3. The method of claim 2, wherein:

for the IPv4 or IPv6 interface, the interface configuration includes a static or dynamic IP address of the emulated device and a static or dynamic gateway IP address;

for the MPLS interface, the interface configuration includes at least one MPLS label;

for a PPPo X interface, the interface configuration includes at least a session ID; and for the Ethernet interface, the interface configuration includes at least a MAC address.

4. The method of claim 3, wherein:

for the IPv4 or IPv6 configuration, the setup protocol for a dynamic IP address is one or more of DHCP or PPP;

for the MPLS configuration, the setup protocol for an MPLS label is one or more of LDP, BGP or RSVP;

for other interfaces, which have interface address configurations that are dynamically learnt using interface setup protocols, the method exercises, as appropriate to the interface, one or more of PPPoX, L2TP, WiMax, IpSec, MacSec, or Fiber Channel.

5. The method of claim 3, wherein the device configuration received for the test device and the DUT to set up network connectivity is one or more industry standard routing or switching protocols known as STP (and its variants), OSPF, RIP, BGP, LDP, BFD, EOAM, IS-IS, LACP, PIM, and RSVP.

6. The method of claim 1, wherein automatically building prototype test packets further includes:

binding at least one data test stream object to objects representing the emulated devices and/or the interfaces configured on the emulated devices; and adding to the data test stream object parameters for data plane traffic including a load of sessions to be emulated and session parameters to be used in the test, consistent with the interface types of the emulated devices.

7. The method of claim 6, wherein automatically combining the prototype test packets and the dynamically generated address information further includes:

registering the interfaces bound to the data test stream object to publish changes in the interface configurations and device configuration related to the emulated devices;

publishing changes; and during the test, using the published changes to automatically updating the dynamically generated address information being used to generate the multiplicity of the test packets.

8. The method of claim 1, further including:

eliciting and receiving from the user configuration information for application protocol data units (referred to as "PDUs") to be included in at least some of the test packets transported across the DUT; and automatically combining packet identification fields and the PDUs with the prototype test packets.

9. A test device that automatically constructs test frames to test a switching, bridging or routing device (referred to as a "device or system under test" or the "DUT") that has ports, the device including:

at least two ports, adapted to be coupled in communication with ports on the DUT;

logic and resources that process objects, which store data and implement methods, and that run daemon processes;

ingress and egress device emulation objects (collectively referred to as the "emulated device objects"), coupled to the ports;

a stack of interface definition objects linked to the emulated device objects that include interface type identifiers and interface configurations and dynamically receive any interface addresses for the interface configurations that depend on interface setup protocols;

one or more network connectivity protocol objects, linked to the emulated device objects, which include configuration information required for the test device and DUT to set up network connectivity;

one or more data test stream objects bound to at least the interface definition objects, wherein the data test stream objects define test frames that prototype test packets to be sent by the emulated ingress device to the emulated egress device via the DUT during a test.

10. The device of claim 9, wherein the interface type identifiers include at least IPv4, IPv6, MPLS, Ethernet, or VLAN, GRE, ITAG, L2TP(v2/3), PP, PPoX, WiMax, HDLC, AAL5, POS, IpSec, MacSec (802.1ae, 802.1af), and Fiber Channel.

11. The device of claim 10, wherein:

for the IPv4 or IPv6 interface type, the interface configuration includes a static or dynamic IP address of the emulated device and a static or dynamic gateway IP address;

for the MPLS interface type, the interface configuration includes at least one MPLS label;

for the PPPoX interface type, the interface configuration includes at least a session ID; and for the Ethernet interface type, the interface configuration includes at least a MAC address.

12. The device of claim 11, wherein the configuration required for the test device and DUT to set up network connectivity includes adapters to network emulation sessions for the interface setup protocols, including:

for the IPv4 or IPv6 interface types, at least DHCP or PPPs;

for the MPLS configuration, the setup protocol for an MPLS label is one or more of LDP, BGP or RVSP; and for other interfaces, which have interface address configurations that are dynamically learnt using interface setup protocols, the method exercises, as appropriate to the interface, one or more of PPPoX, L2TP, WiMax, IpSec, MacSec, or Fiber Channel.

13. The device of claim 11, wherein the data test stream objects are further bound to the network connectivity protocol objects, and the network connectivity protocol objects support at least one or more industry standard routing or switching protocols known as STP (and its variants), OSPF, RIP, BGP, LDP, BFD, EOAM, IS-IS, ACP, PIM, and RSVP.

14. The device of claim 9, wherein the data test stream objects further include data for a load of sessions and session parameters that control the test consistent with the interface types of the emulated devices.

15. The device of claim 14, further adapted to:

register the interfaces bound to the data test stream objects to publish changes in the interface configurations and device configuration related to the emulated devices; and automatically update the dynamically received interface addresses on the test frames that prototype the test packets.

* * * * *

UNITED STATES PATENT AND TRADEMARK OFFICE
CERTIFICATE OF CORRECTION

| | |
|---|---|
| PATENT NO. | : 7,826,381 B1 |
| APPLICATION NO. | : 12/130944 |
| DATED | : November 2, 2010 |
| INVENTOR(S) | : Abhitesh Kastuar et al. |

It is certified that error appears in the above-identified patent and that said Letters Patent is hereby corrected as shown below:

\*\*At column 16 claim no. 7 line 19 delete "updating" and insert -- update --\*\*

Signed and Sealed this

Twenty-first Day of December, 2010

David J. Kappos
*Director of the United States Patent and Trademark Office*